United States Patent [19]
Maty et al.

[11] Patent Number: 6,132,923
[45] Date of Patent: Oct. 17, 2000

[54] ANTICURL BACKING LAYER IN ELECTROSTATOGRAPHIC IMAGING MEMBERS

[75] Inventors: David J. Maty, Ontario; John A. Bergfield, Macedon; Joseph S. Cappiello; Vincent J. Cilento, both of Rochester; Karen S. Garland, Palmyra; Anita P. Lynch, Webster; Neil S. Patterson, Pittsford; June E. Schneider, Honeoye Falls; Joellen Simone, Ontario; Kent J. Evans, Lima, all of N.Y.

[73] Assignee: Xerox Corporation, Stamford, Conn.

[21] Appl. No.: 09/458,404

[22] Filed: Dec. 10, 1999

[51] Int. Cl.⁷ ........................................ G03G 5/00
[52] U.S. Cl. ............................. 430/129; 427/358
[58] Field of Search .............................. 430/129; 427/358

[56] References Cited

U.S. PATENT DOCUMENTS

| | | | |
|---|---|---|---|
| 4,521,457 | 6/1985 | Russell et al. | 427/286 |
| 4,943,508 | 7/1990 | Yu | 430/129 |
| 5,421,085 | 6/1995 | Muscato et al. | 29/890.1 |
| 5,614,260 | 3/1997 | Darcy | 427/277 |
| 5,725,983 | 3/1998 | Yu | 430/58 |
| 6,025,102 | 2/2000 | Pai et al. | 430/133 |
| 6,057,000 | 5/2000 | Cai | 427/358 |

*Primary Examiner*—John Goodrow

[57] ABSTRACT

A flexible electrostatographic imaging member having at least a first parallel side and a second parallel side, the imaging member including
- a supporting substrate layer,
- at least one imaging layer on one side of the substrate layer,
- and an anticurl backing layer on the opposite side of the substrate layer, the anticurl backing layer including
  - a major central region having a substantially uniform thickness,
  - a first minor edge region along the first parallel side, and
  - a second minor edge region along the second parallel side, the first minor edge region and the second edge region each having a thickness greater than the thickness of the major central region.

A process for fabricating the imaging member is also disclosed.

24 Claims, 7 Drawing Sheets

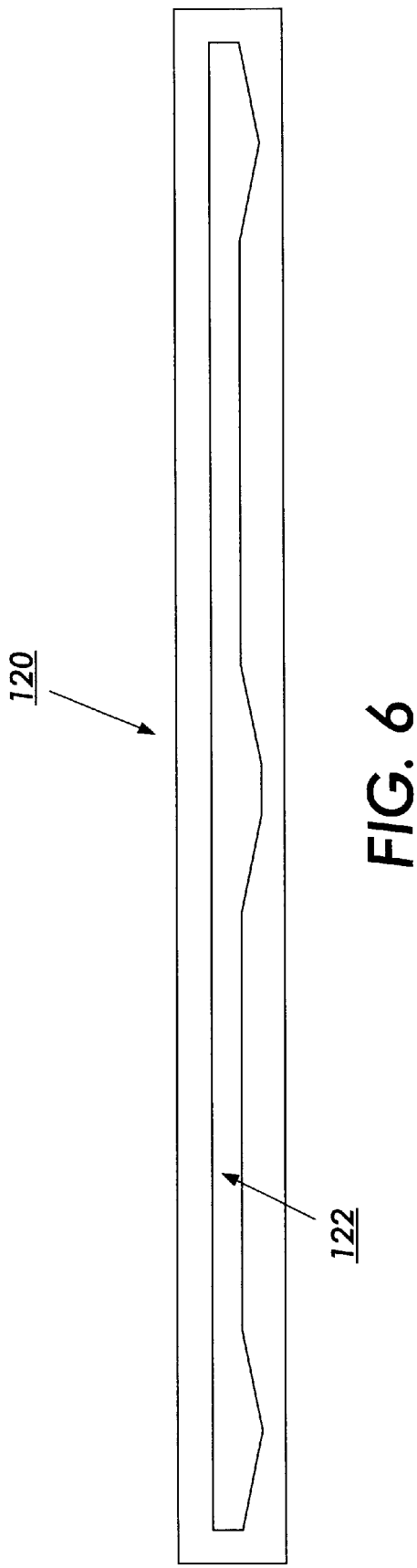

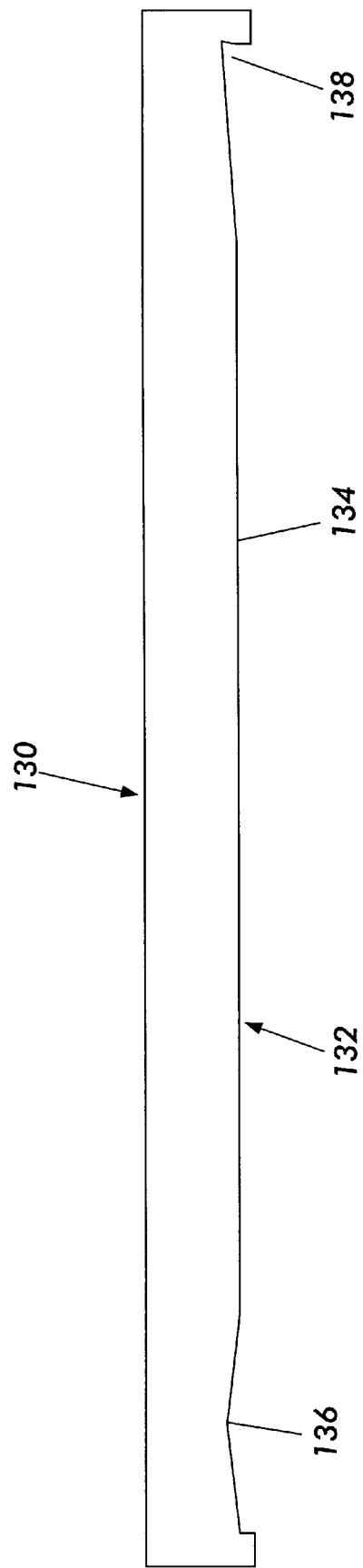

ANTICURL BACKING LAYER IN ELECTROSTATOGRAPHIC IMAGING MEMBERS

BACKGROUND OF THE INVENTION

This invention relates in general to electrostatography and, more specifically, to an improved electrostatographic imaging member and process for fabricating the member.

Electrostatographic imaging members are well known. Typical electrophotographic imaging members include photosensitive members (photoreceptors) that are commonly utilized in electrophotographic (xerographic) processes in either a flexible belt or a rigid drum configuration. The electrophotographic imaging member may also be a flexible intermediate transfer belt. The flexible belt may be seamless or seamed. These belts are usually formed by cutting a rectangular sheet from a web, overlapping opposite ends, and welding the overlapped ends together to form a welded seam. These electrophotographic imaging members comprise a photoconductive layer comprising a single layer or composite layers. One type of composite photoconductive layer used in xerography is illustrated in U.S. Pat. No. 4,265,990 which describes a photosensitive member having at least two electrically operative layers. One layer comprises a photoconductive layer which is capable of photogenerating holes and injecting the photogenerated holes into a contiguous charge transport layer. Generally, where the two electrically operative layers are supported on a conductive layer, the photoconductive layer is sandwiched between a contiguous charge transport layer and the supporting conductive layer. Alternatively, the charge transport layer may be sandwiched between the supporting electrode and a photoconductive layer. Photosensitive members having at least two electrically operative layers, as disclosed above, provide excellent electrostatic latent images when charged with a uniform electrostatic charge, exposed to a light image and thereafter developed with finely divided electroscopic marking particles. The resulting toner image is usually transferred to a suitable receiving member such as paper or to an intermediate transfer member which thereafter transfers the image to a member such as paper.

As more advanced, higher speed electrophotographic copiers, duplicators and printers were developed, degradation of image quality was encountered during extended cycling. Moreover, complex, highly sophisticated duplicating and printing systems operating at very high speeds have placed stringent requirements including narrow operating limits on photoreceptors. For example, the numerous layers found in many modern photoconductive imaging members must be highly flexible, adhere well to adjacent layers, and exhibit predictable electrical characteristics within narrow operating limits to provide excellent toner images over many thousands of cycles. One type of multilayered photoreceptor that has been employed as a belt in electrophotographic imaging systems comprises a substrate layer, a conductive layer, a blocking layer, an adhesive layer, a charge generating layer, a charge transport layer and a conductive ground strip layer adjacent to one edge of the imaging layers, and an optional overcoating layer. This photoreceptor usually comprises an anticurl back coating on the side of the substrate opposite the side carrying the charge generating layer and a charge transport layer. The anticurl back coating prevents the photoreceptor from spontaneously curling after application of the above described coatings, particularly the charge transport layer. Curling of a photoreceptor web is undesirable because it hinders fabrication of the web into cut sheets and subsequent welding into a belt. Moreover, a belt exhibiting curl in highly sophisticated precision copiers, duplicators, facsimile, and the like machines leads to print and machine performance issues such as image print defects characterized by non-uniform density, contact between the curled edges of the photoreceptor with adjacent subsystems such as charging, and development subsystems which result in damage to both the belt and the subsystems, difficulty in photoreceptor belt loading, and the like. Typical adjacent subsystems include, for example charging subsystems, imaging subsystems, developing subsystems, cleaning subsystems, and the like.

There is also a great need for long service life flexible belt photoreceptors. Imaging members are generally exposed to repetitive electrophotographic cycling which subjects the exposed anticurl back layer thereof to abrasion, chemical attack, heat, multiple exposures to light, and the like. With repetitive cycling, the multilayered electrophotographic imaging belt structure gradually curls "up" at the edges to shorten service life even where other components of the belt would otherwise still perform satisfactorily. It is hypothesized that over time loss of residual solvent occurs from within the device and wear of the anticurl backing layer causes the multilayered electrophotographic imaging belt structure to eventually curl "up" at the edges. This leads to print and machine performance issues described above.

Numerous techniques have been devised to form a layer of a coating composition on a substrate. One of these techniques involves the use of an extrusion die from which the coating composition is extruded onto the substrate. For fabrication of web type, flexible electrophotographic imaging members, the extrusion die must lay down very thin coatings meeting extremely precise, critical tolerances in the single or double digit micrometer ranges. Moreover, a plurality of dies may be needed to lay down extruded coatings conventionally employed for flexible electrophotographic imaging members. The flexible electrophotographic imaging members may also comprise additional coatings applied by non-extrusion coating techniques so that the finished electrophotographic imaging member can contain as many as 5 different coatings. The extrusion die usually comprises spaced walls, each having a surface facing each other. These spaced walls form a narrow, elongated, passageway. Generally a coating composition is supplied by a reservoir to one side of the passageway and the coating composition travels through the passageway to an exit slot on the side of the passageway opposite the reservoir. Dams are provided at opposite ends of the passageway to confine the coating composition within the passageway as the coating travels from the reservoir to the exit slot. The surface of the dams facing the coating composition is generally perpendicular to the exit slot.

These extrusion dies form coatings having a uniform thickness. Where, on a single underlying surface, a coating layer of one composition is to be formed adjacent to a coating layer having a different coating composition, two different dies may be arranged side by side (e.g. see U.S. Pat. No. 4,521,457 and U.S. Pat. No. 5,614,260) to simultaneously extrude the two different compositions. This technique forms side by side coatings having a distinct junction where side by side coatings contact each other.

INFORMATION DISCLOSURE STATEMENT

U.S. Pat. No. 5,614,260 to Darcy, issued Mar. 25, 1997—A process is disclosed for applying to a surface of a support member at least one ribbon-like stream of a first coating composition side-by-side with at least one ribbon-like stream of a second coating composition comprising providing an extrusion die source for the ribbon-like stream of the first coating composition, providing a slide die source for the ribbon-like stream of the second coating composition, establishing relative motion between the surface of the support member and the source of the ribbon-like streams, simultaneously and continuously applying the ribbon-like streams to the surface of the support member whereby the ribbon-like streams extend in the direction of relative movement of the surface of the support member and the sources of the ribbon-like streams to form a continuous unitary layer having a boundary between the side-by-side ribbon-like streams on the surface of the support member and drying the continuous unitary layer to form a dried coating of the first coating composition side-by-side with a dried coating of the second coating composition. This process may be carried out with apparatus comprising an extrusion die attached to and supporting a slide die, the extrusion die being adapted to applying to a surface of a support member at least one ribbon-like stream of a first coating composition and the slide die being adapted to apply to the surface a ribbon-like stream of a second coating composition side-by-side to and in edge contact with the ribbon-like stream of the first coating composition.

U.S. Pat. No. 5,421,085 to Muscato et al, issued Jun. 6, 1995—A process is disclosed for fabricating an extrusion die including providing hard brass stock, machining the stock to form a thick rigid machined die end dam having a sharp corner, annealing the machined die end dam, providing a die body having at least one open end and an extrusion exit slot, and securing the machined end dam to the open end of the die to form an extrusion die assembly, the sharp corner being adjacent one end of the exit slot. This die assembly is employed to form a coating on a surface of a substrate by establishing relative motion between the surface of the substrate and the extrusion die assembly and extruding a ribbon-like stream of coating composition from the die through the extrusion exit slot onto the surface of the substrate to form a coating layer.

U.S. Pat. No. 4,521,457 to Russell et al, issued Jun. 4, 1985—At least one ribbon-like stream of a first coating composition adjacent to and in edge contact with at least one second ribbon-like stream of a second coating composition are deposited on the surface of a support member by establishing relative motion between the surface of the support member and the ribbon-like streams, simultaneously constraining and forming the ribbon-like streams parallel to and closely spaced from each other, contacting adjacent edges of the ribbon-like streams prior to applying the ribbon-like streams to the surface of the support member and thereafter applying the ribbon-like streams to the surface of the support member.

U.S. Pat. No. 5,725,983 to Yu, issued Mar. 10, 1998—An electrophotographic imaging member is disclosed including a supporting substrate having an electrically conductive layer, a hole blocking layer, an optional adhesive layer, a charge generating layer, a charge transport layer, an anticurl back coating, a ground strip layer and an optional overcoating layer, at least one of the charge transport layer, anticurl back coating, ground strip layer and the overcoating layer comprising a blend of inorganic and organic particles homogeneously distributed in a film forming matrix in a weight ratio of between about 3:7 and about 7:3, the inorganic particles and organic particles having a particle diameter less than about 4.5 micrometers. These electrophotographic imaging members may have a flexible belt form or rigid drum configuration. These imaging members may be utilized in an electrophotographic imaging process.

While the above mentioned electrostatographic imaging members may be suitable for their intended purposes, there continues to be a need for improved imaging members, particularly for modified multilayered electrostatographic imaging members in a flexible belt configuration, and processes for fabricating these imaging members.

BRIEF SUMMARY OF THE INVENTION

It is, therefore, an object of the present invention to provide an improved layered electrostatographic imaging members which overcome the above noted disadvantages.

It is another object of the present invention to provide an improved layered electrostatographic imaging member which exhibits superb resistance to curl after extended use in imaging systems.

It is still another object of the present invention to provide an improved layered electrostatographic imaging member which avoids collisions with closely adjacent imaging subsystems.

It is yet another object of the present invention to provide an improved layered electrostatographic imaging member with a longer useful life.

The foregoing objects and others are accomplished in accordance with this invention by providing a flexible electrostatographic imaging member having at least a first parallel side and a second parallel side, the imaging member comprising a supporting substrate layer, at least one imaging layer on one side of the substrate layer, and an anticurl backing layer on the opposite side of the substrate layer, the anticurl backing layer comprising
a major central region having a substantially uniform thickness,
a first minor edge region along the first parallel side, and
a second minor edge region along the second parallel side, the first minor edge region and the second edge region each having a thickness greater than the thickness of the major central region.

DESCRIPTION OF THE DRAWINGS

A more complete understanding of the present invention can be obtained by reference to the accompanying drawings wherein:

FIG. 6 is a schematic front view in elevation of an embodiment of an extrusion slot useful for fabrication of an anticurl layer for imaging members, prior to slitting, the imaging members having a ground strip on one side.

FIG. 7 is a schematic front view in elevation of an embodiment of a draw bar useful for fabrication of an anticurl layer for an imaging member having a ground strip along one edge.

Figure 1:
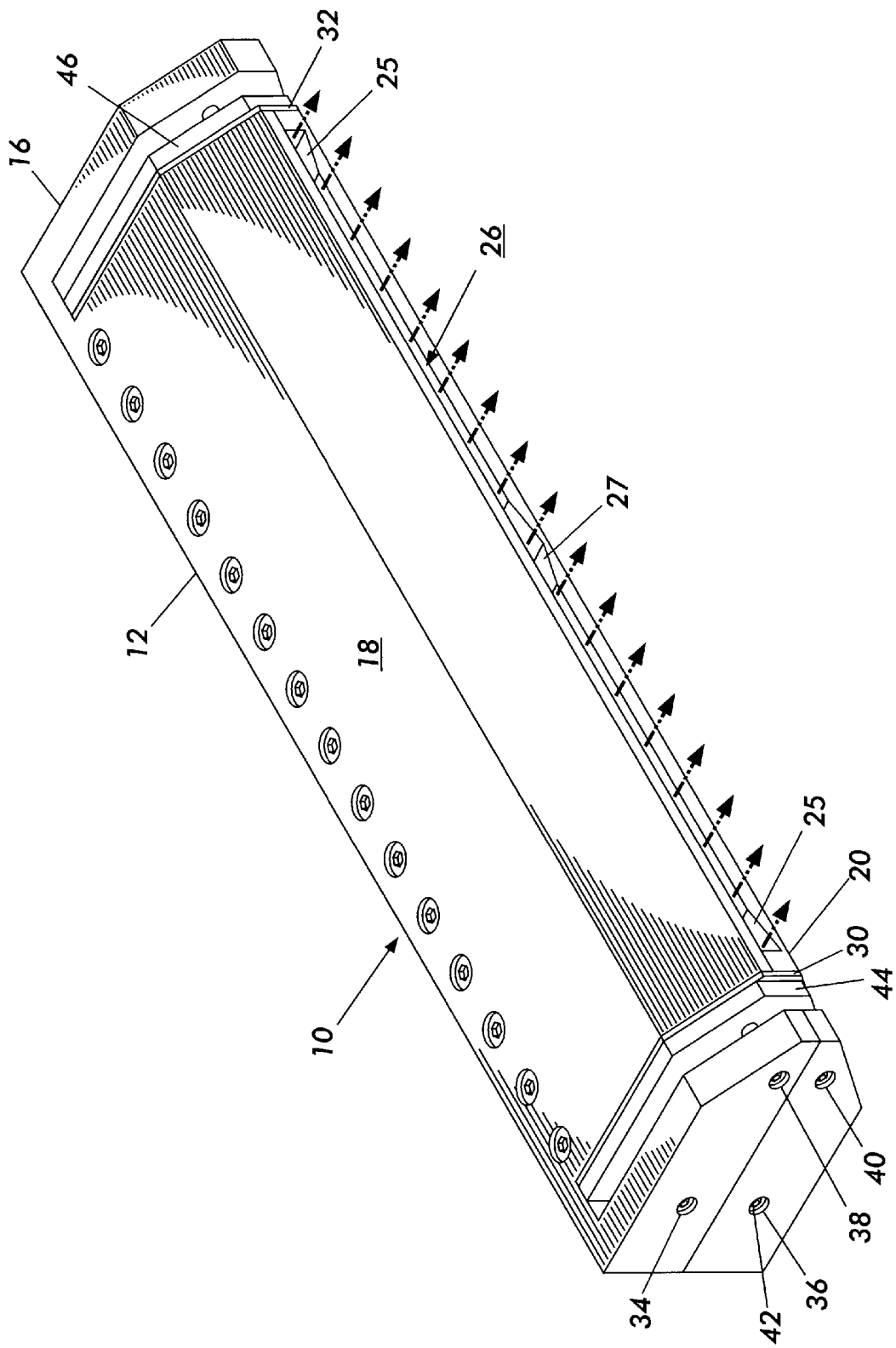
FIG. 1 is a schematic illustration of a schematic, isometric, sectional view showing an extrusion die comprising a die body having an improved extrusion slot.

These figures merely schematically illustrate the invention and are not intended to indicate relative size and dimensions of the device or components thereof. Most of the dimensions are exaggerated to more clearly illustrate the invention.

For reasons of convenience, the invention will be described for electrophotographic imaging members in flexible belt form even though this invention includes electrostatographic imaging members having similar configurations.

DETAILED DESCRIPTION OF THE DRAWING

Figure 2:
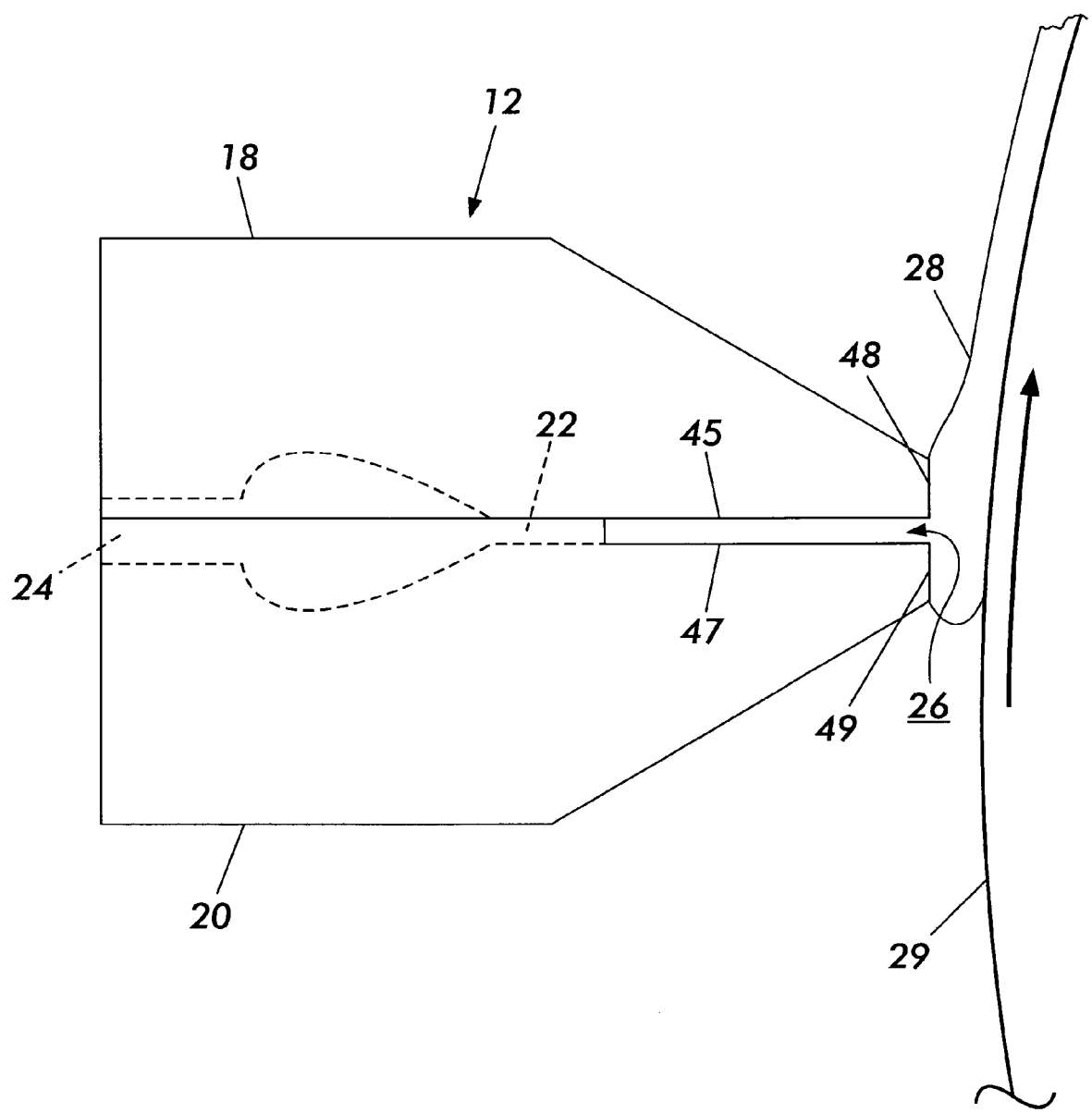
FIG. 2 is a schematic, sectional end view of a die body from which a ribbon-like stream of a coating composition is extruded.

Referring to FIGS. 1 and 2, a die assembly designated by the numeral 10 is illustrated. Generally, extrusion dies are utilized for extrusion of coating compositions onto a support. Extrusion dies are well know and described, for example, in U.S. Pat. No. 3,920,862 and U.S. Pat. No. 4,521,457, the entire disclosures thereof being incorporated herein by reference. Die assembly 10 is a modified die for fabrication of an anticurl back coating for photoreceptors of this invention. Die assembly 10 comprises a die body 12 equipped with clamping flanges 16. Die body 12 comprises an upper lip 18 and lower lip 20 which are spaced apart to form a narrow passageway 22 (see FIG. 2) which leads from inlet 24 to exit slot 26 through which an anticurl backing coating composition 28 is extruded as a ribbon-like stream in the direction shown by the arrows (see FIG. 1) onto substrate 29 (see FIG. 2) moving in the direction shown by the arrow. The width, thickness, and the like of the ribbon-like stream is varied in accordance with factors such as the viscosity of the coating composition, thickness of the coating desired, height of passageway 22, and width of the substrate 29 on which the coating composition is applied, and the like. However, unlike the uniform slot height of exit slots of previous extrusion dies for anticurl backing coatings, the slot height of exit slot 26 illustrated in FIGS. 1 and 2 is higher in regions corresponding to the edges of a final photoreceptor. Since the extrusion die shown in FIG. 1 forms a double wide coated web that is slit down the middle after completion of coating to form two single wide photoreceptors, it has larger slot height openings 25 at each extreme end of exit slot 26 and a double wide larger slot height opening 27 at the center of exit slot 26. End dams 30 and 32 (see FIG. 1) are secured to the ends of upper lip 18 and lower lip 20 of die body 12 to confine coating composition 28 within passageway 22 as coating composition 28 travels from inlet 24 to exit slot 26. The length of passageway 22 should be sufficiently long to ensure laminar flow. Control of the distance of exit slot 26 from substrate 29 enables coating composition 28 to bridge the gap between each exit slot 26 and substrate 29 depending upon the viscosity and rate of flow of coating composition 28 and the relative rate movement between die assembly 10 and substrate 29. Generally, it is preferred to position the narrow extrusion slot outlet for lower viscosity ribbon-like streams closer to the support surface than the narrow extrusion slot outlet for higher viscosity ribbon-like streams to form a bead of coating material which functions as a reservoir for greater control of coating deposition. As conventional in the art, coating composition 28 is supplied from a reservoir (not shown) under pressure using a conventional pump or other suitable well known means such as a gas pressure system (not shown). Clamping flanges 16 contain threaded holes 34, 36, 38 and 40 into which set screws 42 are screwed to secure end dams 30 and 32 between backing plates 44 and 46, respectively, and the adjacent ends of upper lip 18 and lower lip 20 of die body 12. Any suitable means such as screws 42 or the like, including, for example, bolts, studs, or clamps (not shown), may be utilized to fasten upper lip 18 and lower lip 20 together. Inner lip surfaces 45 and 47 (see FIG. 2) of upper lip 18 and lower lip 20, respectively, are precision ground to ensure accurate control of the deposited coating thicknesses. Under stable conditions, the extruded coating materials pins or clings to the outer lip surfaces 48 and 49 of upper lip 18 and lower lip 20, respectively. Outer lip surfaces 48 and 49 may be of any suitable configuration including squared, knife and the like. A flat squared end is preferred for the coating embodiment illustrated. The flat outer lip surfaces 48 and 49 appear to further support and stabilize the beads during bead coating operations. Because of the profile of the exit slot 26, more anticurl backing coating composition is extruded at the larger slot height openings 25 at the ends of exit slot 26 and double wide larger slot height opening 27 at the center of exit slot 26. This will allow a thicker anticurl backing coating in these locations. The presence of the thicker anticurl backing coatings at these locations controls the excessive potential positive edge curl associated with flexible multilayered photoreceptors. It is believed that slightly increasing the thickness of anticurl material in these areas increases the beam strength and stiffness sufficiently to overcome the curl problem. Since the beam strength of the flexible photoreceptor involves a "cubed" factor relatively little increase thickness is needed at the edges. Additionally, the extra thickness of the anticurl layer along the parallel sides of the flexible photoreceptor will hold residual solvent longer thereby having a positive effect on curl.

Figure 3:
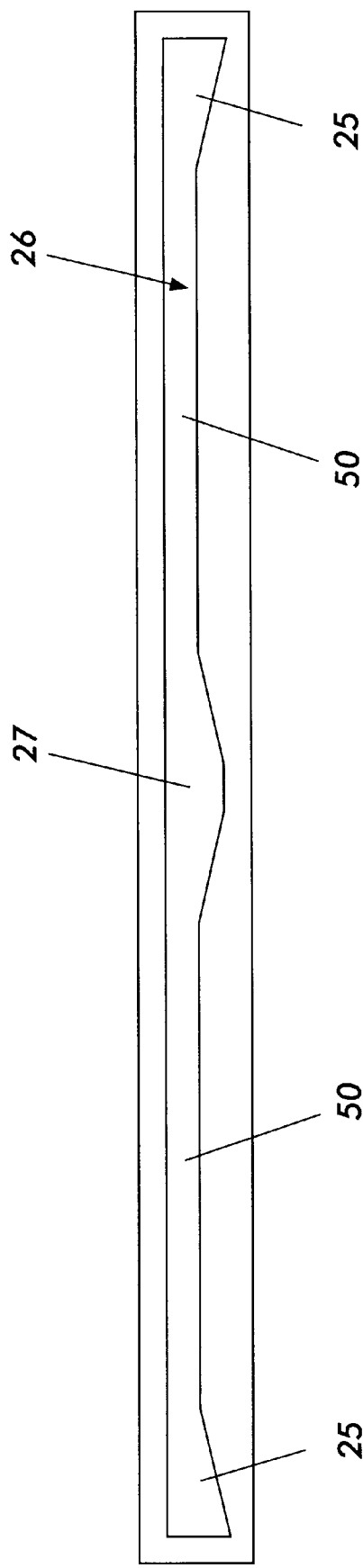
FIG. 3 is a schematic front view in elevation of an embodiment of an extrusion slot useful for fabrication of the anticurl layer for the imaging member of this invention.

A more generalized profile of the exit slot 26 of FIGS. 1 and 2 is shown in FIG. 3. There are larger slot height openings 25 at each extreme end of exit slot 26 and a double wide larger slot height opening 27 at the center of exit slot 26. Major central regions 50 between the larger slot height openings 25 and double wide larger slot height opening 27 have a uniform slot height to form a major central region of uniform thickness in the extruded anticurl layer. The major central region underlies all of the functional imaging surface of the final imaging member. The functional imaging surface is the surface where the actual images are formed with the final imaging member. The larger slot height openings 25 form a minor edge region along each extreme edge of the double wide anticurl layer. Thus, the deposited minor edge region lies parallel to one of the two parallel sides of the final photoreceptor. The larger slot height openings 25 are tapered with the greatest height adjacent to one parallel side of the final imaging member and the smallest height being equal to the thickness of the major central region 50. The double wide larger slot height opening 27 is essentially two larger slot height openings 25 arranged back to back with the greatest height being at the center. Thus, when the coated web is slit along the middle in a direction parallel to the parallel sides of the original web, the slitting essentially forms a minor edge region on each of the resulting webs that is a mirror image of the minor edge region aligned along the opposite parallel side.

Figure 4:
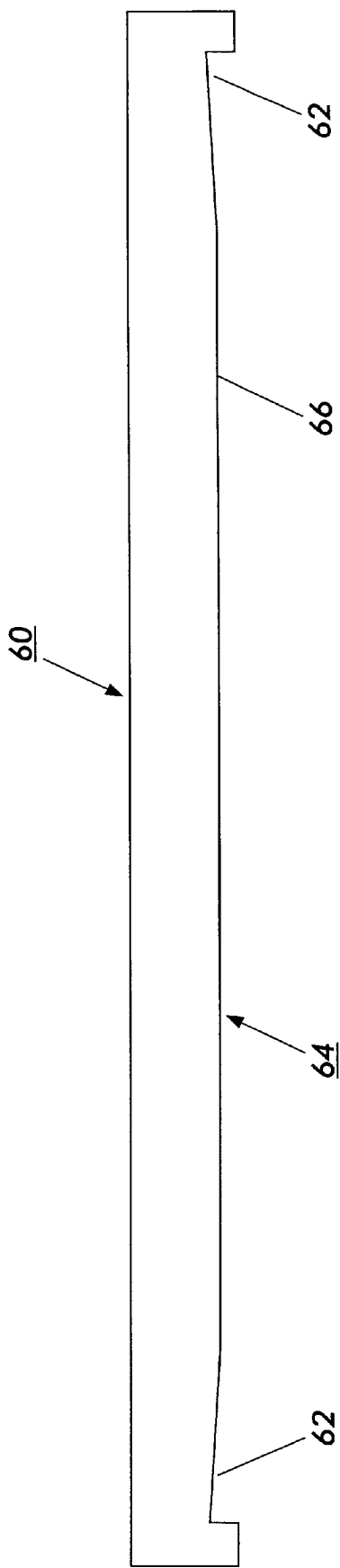
FIG. 4 is a schematic front view in elevation of a draw bar useful for fabrication of the anticurl layer for the imaging member of this invention.

Illustrated in FIG. 4 is a cross sectional view of a draw bar 60 used for forming an anticurl backing layer on a single wide web. Draw bar 60 contains deep channels 62 at each extreme end of coating channel 64 and a shallower, but wide and shallower channel 66 in the major central region of coating channel 64. Wide and shallower channel 66, between deep channels 62, has a uniform depth to form a major central region of uniform thickness in the anticurl layer formed by draw bar 60. The major central region formed by wide and shallower channel 66, underlies all of the functional imaging surface of the final imaging member. The deep channels 62 form a minor edge region along each parallel side of the anticurl layer. Thus, in the final anticurl backing coating, a first deposited minor edge region lies parallel to a first parallel side of the final imaging member and a second deposited minor edge region lies parallel to a second parallel side of the final imaging member. The deep channels 62 are tapered with the greatest depth being adjacent to a parallel side of the final imaging member and the least shallow depth being substantially equal to the thickness of the major central region of coating channel 64.

Figure 5:
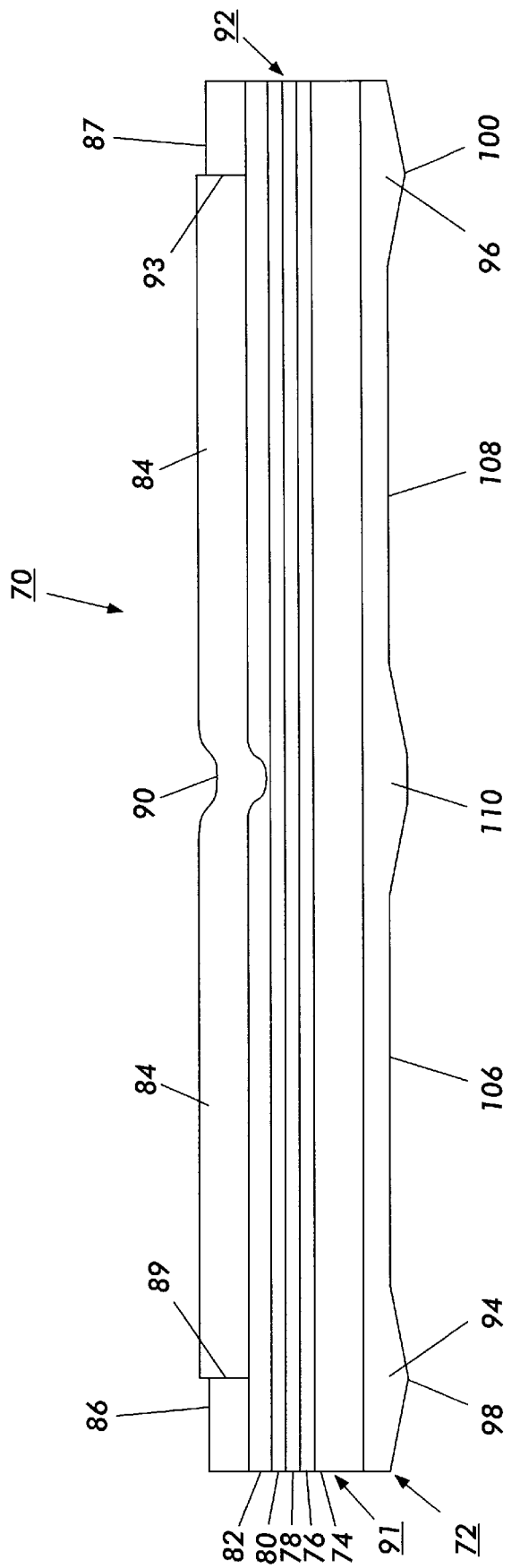
FIG. 5 is a schematic cross sectional view of an embodiment, prior to slitting, of a web comprising an imaging member with an anticurl layer.

Referring to FIG. 5, a cross sectional view in a direction along the length of a coated double wide photoreceptor web 70 is shown. All the layers in web 70 are conventional except the anticurl backing layer 72. More specifically, web 70 comprises the anticurl backing layer 72 of this invention, a substrate layer 74, a conductive layer 76, a charge blocking layer 78, an adhesive layer 80, a charge generating layer 82, a charge transport layer 84 and ground strip layers 86 and 87 which form edge to edge contact junctions 89 and 93, respectively, with charge transport layer 84. A narrow depression 90, running the length of the web 70, formed by the absence of a charge generating layer 82 material is maintained to facilitate lengthwise slitting of double wide photoreceptor 70 and to prevent delamination of some of the coatings on the conductive layer 76 side of substrate layer 74. Since the charge generating layer is very thin, e.g., about 1 micrometer, the absence of charge generating layer material in the region of narrow depression 90 underlying is virtually unnoticeable as a depression. However, it can be identified by color and reflectivity differences. Because web 70 has a narrow ground strip layer 86 along a first parallel side 91 of the web 70 adjacent to and in edge to edge contact with the charge transport layer 84, the edge to edge contact junction 89 extending parallel to the first parallel side 91, a first minor edge region 94 in anticurl backing layer 72 is positioned under the narrow ground strip 86 and has a width extending from substantially the first parallel side 91 past the edge to edge contact junction 89 and under a narrow region of the charge transport layer. Similarly, since double wide web 70 has another narrow ground strip layer 87 along a second parallel side 92 adjacent to and in edge to edge contact with the charge transport layer 84, the edge to edge contact junction 93 extending parallel to the second parallel side 92, a second minor edge region 96 in anticurl backing layer 72 is positioned under the narrow ground strip 87 and has a width extending from substantially the second parallel side 92 past the edge to edge contact junction 93 and under a narrow region of the charge transport layer 84. The first minor edge region 94 and second minor edge region 96 preferably have a thickness peak 98 and 100, respectively, substantially directly under and aligned with edge to edge contact junction 89 and edge to edge contact junction 93, respectively. The thickness of a cross 8 section of first minor edge region 94 gradually becomes thinner in a direction away from the thickness peak 98 and toward the first parallel side 91 and also becomes thinner in a direction away from the peak 98 toward the second parallel side 92 until the thickness of the first minor edge region 94 is substantially equal to the thickness of the major central region 106. Similarly, the thickness of a cross section of second minor edge region 96 gradually becomes thinner in a direction away from the thickness peak 100 and toward the second parallel side 92 and also becomes thinner in a direction away from the peak 100 toward the first parallel side 91 until the thickness of the second minor edge region 100 is substantially equal to the thickness of the major central region 108. The double wide minor region 110 in the middle of web 70 is, in essence, two back to back minor edge regions that form after web 70 is slit lengthwise along narrow uncoated strip 90. Thus, double wide minor region 110 underlies narrow uncoated strip 90 and part of the region coated with blocking layer 78, adhesive layer 80, charge generating layer 82 and charge transport layer 84. After slitting of web 70, the shape of a cross section of each half of double wide minor region 110 is substantially a mirror image of the part of minor edge region 94 or 96 on the opposite side of major central region 106 or 108, if minor edge region 94 or 96 were slit along thickness peak 98 or 100, respectively.

Shown in FIG. 6 is an extrusion die 120 having an extrusion slot 122 suitable for forming the anticurl backing layer illustrated in FIG. 5.

Illustrated in FIG. 7 is a draw bar 130 having coating channel 132 suitable for forming an anticurl backing layer for a single wide photoreceptor web having parallel sides and having a ground strip along only one of the parallel sides. The shallow section 134 of coating gap or channel 132 forms the major central region of the anticurl layer where the layer thickness is uniform. Deep gap or channel 136 forms a first minor edge region of the anticurl backing layer and the deepest point of deep channel 136 underlies and runs parallel to the edge to edge contact junction between a conventional ground strip and a charge transport layer that are located on the opposite side of the substrate being coated with the anticurl backing layer (e.g., see left half of FIG. 5). The bottom of deep channel 136 gradually tapers in both directions from the deepest point to a depth substantially equal to the depth of coating channel 132. The minor edge region formed in the anticurl backing layer by deep channel 136 lies under the ground strip layer and part of the adjacent edge of the charge transport layer of the final photoreceptor. Deep channel 138 forms a minor edge region of anticurl backing layer along the parallel side of a photoreceptor web opposite the parallel side where the wider minor edge region is located. As is well known in the art, the lands at each end of draw bar 130 ride on the exposed surface of a substrate layer during the coating operation.

Electrostatographic flexible belt imaging members are well known in the art. Typically, a flexible substrate is provided having an electrically conductive surface. For electrophotographic imaging members, at least one photoconductive layer is then applied to the electrically conductive surface. A charge blocking layer may be applied to the electrically conductive layer prior to the application of the photoconductive layer. If desired, an adhesive layer may be utilized between the charge blocking layer and the photoconductive layer. For multilayered photoreceptors, a charge generation binder layer is usually applied onto an adhesive layer, if present, or directly over the blocking layer, and a charge transport layer is subsequently formed on the charge generation layer. For ionographic imaging members, an electrically insulating dielectric imaging layer is applied to the electrically conductive surface. The substrate contains an anti-curl back coating on the side opposite the side bearing the charge transport layer or dielectric imaging layer.

The substrate may be opaque or substantially transparent and may comprise numerous suitable materials having the required mechanical properties. Accordingly, the substrate may comprise a layer of an electrically non-conductive or conductive material such as an inorganic or an organic composition. As electrically non-conducting materials, there may be employed various resins known for this purpose including polyesters, polycarbonates, polyamides, polyurethanes, polysulfones, and the like which are flexible as thin webs. The electrically insulating or conductive substrate should be flexible and in the form of an endless flexible belt. Preferably, the endless flexible belt shaped substrate comprises a commercially available biaxially oriented polyester known as Mylar or Melinex, available from E. I. du Pont de Nemours & Co. or Hostaphan, available from Mitsubishi Films, Inc.

The thickness of the substrate layer depends on numerous factors, including beam strength and economical considerations, and thus this layer for a flexible belt may be of substantial thickness, for example, about 175 micrometers, or of minimum thickness less than 50 micrometers, provided there are no adverse effects on the final electrostatographic device. In one flexible belt embodiment, the thickness of this layer ranges from about 65 micrometers to about 150 micrometers, and preferably from about 75 micrometers to about 100 micrometers for optimum flexibility and minimum stretch when cycled around small diameter rollers, e.g. 19 millimeter diameter rollers.

The conductive layer may vary in thickness over substantially wide ranges depending on the optical transparency and degree of flexibility desired for the electrostatographic member. Accordingly, for a flexible photoresponsive imaging device, the thickness of the conductive layer may be between about 20 angstrom units to about 750 angstrom units, and more preferably from about 100 Angstrom units to about 200 angstrom units for an optimum combination of electrical conductivity, flexibility and light transmission. The flexible conductive layer may be an electrically conductive metal layer formed, for example, on the substrate by any suitable coating technique, such as a vacuum depositing technique. Typical metals include aluminum, zirconium, niobium, tantalum, vanadium and hafnium, titanium, nickel, stainless steel, chromium, tungsten, molybdenum, and the like. Regardless of the technique employed to form the metal layer, a thin layer of metal oxide forms on the outer surface of most metals upon exposure to air. Thus, when other layers overlying the metal layer are characterized as "contiguous" layers, it is intended that these overlying contiguous layers may, in fact, contact a thin metal oxide layer that has formed on the outer surface of the oxidizable metal layer. Generally, for rear erase exposure, a conductive layer light transparency of at least about 15 percent is desirable. The conductive layer need not be limited to metals. Other examples of conductive layers may be combinations of materials such as conductive indium tin oxide as a transparent layer for light having a wavelength between about 4000 Angstroms and about 7000 Angstroms or a transparent copper iodide (CuI) or a conductive carbon black dispersed in a plastic binder as an opaque conductive layer. A typical electrical conductivity for conductive layers for electrophotographic imaging members in slow speed copiers is about $10^2$ to $10^3$ ohms/square.

After formation of an electrically conductive surface, a charge blocking layer may be applied thereto to photoreceptors. Generally, electron blocking layers for positively charged photoreceptors allow holes from the imaging surface of the photoreceptor to migrate toward the conductive layer. Any suitable blocking layer capable of forming an electronic barrier to holes between the adjacent photoconductive layer and the underlying conductive layer may be utilized. The blocking layer may be nitrogen containing siloxanes or nitrogen containing titanium compounds as disclosed, for example, in U.S. Pat. No. 4,338,387, U.S. Pat. No. 4,286,033 and U.S. Pat. No. 4,291,110. The disclosures of these patents are incorporated herein in their entirety. A preferred blocking layer comprises a reaction product between a hydrolyzed silane and the oxidized surface of a metal ground plane layer. The blocking layer may be applied by any suitable conventional technique such as spraying, dip coating, draw bar coating, gravure coating, silk screening, air knife coating, reverse roll coating, vacuum deposition, chemical treatment and the like. For convenience in obtaining thin layers, the blocking layers are preferably applied in the form of a dilute solution, with the solvent being removed after deposition of the coating by conventional techniques such as by vacuum, heating and the like. The blocking layer should be continuous and have a thickness of less than about 0.2 micrometer because greater thickness may lead to undesirably high residual voltage.

An optional adhesive layer may applied to the hole blocking layer. Any suitable adhesive layer well known in the art may be utilized. Typical adhesive layer materials include, for example, polyesters, duPont 49,000 (available from E. I. duPont de Nemours and Company), Vitel PE100 (available from Bostik, Inc.), polyurethanes, and the like. Satisfactory results may be achieved with adhesive layer thickness between about 0.05 micrometer (500 angstroms) and about 0.3 micrometer (3,000 angstroms). Conventional techniques for applying an adhesive layer coating mixture to the charge blocking layer include spraying, dip coating, roll coating, wire wound rod coating, gravure coating, Bird applicator coating, and the like. Drying of the deposited coating may be effected by any suitable conventional technique such as oven drying, infra red radiation drying, air drying and the like.

Any suitable photogenerating layer may be applied to the adhesive blocking layer which can then be overcoated with a contiguous hole transport layer as described hereinafter. Examples of typical photogenerating layers include inorganic photoconductive particles such as amorphous selenium, trigonal selenium, and selenium alloys selected from the group consisting of selenium-tellurium, selenium-tellurium-arsenic, selenium arsenide and mixtures thereof, and organic photoconductive particles including various phthalocyanine pigment such as the X-form of metal free phthalocyanine described in U.S. Pat. No. 3,357,989, metal phthalocyanines such as vanadyl phthalocyanine and copper phthalocyanine, dibromoanthanthrone, squarylium, quinacridones available from DuPont under the tradename Monastral Red, Monastral violet and Monastral Red Y, Vat orange 1 and Vat orange 3 trade names for dibromo anthanthrone pigments, benzimidazole perylene, substituted 2,4-diaminotriazines disclosed in U.S. Pat. No. 3,442,781, polynuclear aromatic quinones available from Allied Chemical Corporation under the tradename Indofast Double Scarlet, Indofast Violet Lake B, Indofast Brilliant Scarlet and Indofast Orange, and the like dispersed in a film forming polymeric binder. Multi-photogenerating layer compositions may be utilized where a photoconductive layer enhances or reduces the properties of the photogenerating layer. Examples of this type of configuration are described in U.S. Pat. No. 4,415, 639, the entire disclosure of this patent being incorporated herein by reference. Other suitable photogenerating materials known in the art may also be utilized, if desired. Charge generating binder layers comprising particles or layers comprising a photoconductive material such as vanadyl phthalocyanine, metal free phthalocyanine, benzimidazole perylene, amorphous selenium, trigonal selenium, selenium alloys such as selenium-tellurium, selenium-tellurium-arsenic, selenium arsenide, and the like and mixtures thereof are especially preferred because of their sensitivity to white light. Vanadyl phthalocyanine, metal free phthalocyanine and tellurium alloys are also preferred because these materials provide the additional benefit of being sensitive to infrared light.

Any suitable polymeric film forming binder material may be employed as the matrix in the photogenerating binder layer. Typical polymeric film forming materials include those described, for example, in U.S. Pat. No. 3,121,006, the entire disclosure of which is incorporated herein by reference. Thus, typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloridevinylchloride copolymers, vinylacetate-vinylidenechloride copolymers, styrene-alkyd resins, polyvinylcarbazole, and the like. These polymers may be block, random or alternating copolymers.

The photogenerating composition or pigment is present in the resinous binder composition in various amounts, generally, however, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition. In one embodiment about 8 percent by volume of the photogenerating pigment is dispersed in about 92 percent by volume of the resinous binder composition.

The photogenerating layer containing photoconductive compositions and/or pigments and the resinous binder material generally ranges in thickness of from about 0.1 micrometer to about 5.0 micrometers, and preferably has a thickness of from about 0.3 micrometer to about 3 micrometers. The photogenerating layer thickness is related to binder content. Higher binder content compositions generally require thicker layers for photogeneration. Thickness outside these ranges can be selected providing the objectives of the present invention are achieved.

Any suitable and conventional technique may be utilized to mix and thereafter apply the photogenerating layer coating mixture. Typical application techniques include spraying, dip coating, roll coating, wire wound rod coating, and the like. Drying of the deposited coating may be effected by any suitable conventional technique such as oven drying, infra red radiation drying, air drying and the like.

The active charge transport layer may comprise an activating compound useful as an additive dispersed in electrically inactive polymeric materials making these materials electrically active. These compounds may be added to polymeric materials which are incapable of supporting the injection of photogenerated holes from the generation material and incapable of allowing the transport of these holes therethrough. This will convert the electrically inactive polymeric material to a material capable of supporting the injection of photogenerated holes from the generation material and capable of allowing the transport of these holes through the active layer in order to discharge the surface charge on the active layer. An especially preferred transport layer employed in one of the two electrically operative layers in the multilayered photoconductor of this invention comprises from about 25 percent to about 75 percent by weight of at least one charge transporting aromatic amine compound, and about 75 percent to about 25 percent by weight of a polymeric film forming resin in which the aromatic amine is soluble.

The charge transport layer forming mixture preferably comprises an aromatic amine compound. Examples of charge transporting aromatic amines represented by the structural formulae above for charge transport layers capable of supporting the injection of photogenerated holes of a charge generating layer and transporting the holes through the charge transport layer include triphenylmethane, bis(4-diethylamine-2-methylphenyl)phenylmethane; 4'-4"-bis (diethylamino)-2',2"-dimethyltriphenylmethane, N,N'-bis (alkylphenyl)-[1,1'-biphenyl]-4,4'-diamine wherein the alkyl is, for example, methyl, ethyl, propyl, n-butyl, etc., N,N'-diphenyl-N,N'-bis(chlorophenyl)-[1,1'-biphenyl]-4,4'-diamine, N,N'-diphenyl-N,N'-bis(3"-methylphenyl)-(1,1'-biphenyl)-4,4'-diamine, and the like dispersed in an inactive resin binder.

Any suitable inactive thermoplastic resin binder soluble in methylene chloride or other suitable solvent may be employed in the process of this invention to form the thermoplastic polymer matrix of the imaging member. Typical inactive resin binders soluble in methylene chloride include polycarbonate resin, polyvinylcarbazole, polyester, polyarylate, polyacrylate, polyether, polysulfone, polystyrene, and the like. Molecular weights can vary from about 20,000 to about 150,000.

Any suitable and conventional technique may be utilized to mix and thereafter apply the charge transport layer coating mixture to the charge generating layer. Typical application techniques include spraying, dip coating, roll coating, wire wound rod coating, and the like. Drying of the deposited coating may be effected by any suitable conventional technique such as oven drying, infra red radiation drying, air drying and the like.

Generally, the thickness of the charge transport layer is between about 2 micrometers and about 50 micrometers, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layer is preferably maintained from about 2:1 to 200:1 and in some instances as great as 400:1. The charge transport layer may extend from the first parallel side to the second parallel side of the imaging member. In another embodiment, the imaging member has a narrow ground strip layer along the first parallel side of the imaging member adjacent to and in edge to edge contact with the charge transport layer, the edge contact extending parallel to the first parallel side.

The preferred electrically inactive resin materials are polycarbonate resins have a molecular weight from about 20,000 to about 150,000, more preferably from about 50,000 to about 120,000. The materials most preferred as the electrically inactive resin material is poly(4,4'-dipropylidene-diphenylene carbonate) with a molecular weight of from about 35,000 to about 40,000, available as Lexan 145 from General Electric Company; poly(4,4'-isopropylidene-diphenylene carbonate) with a molecular weight of from about 40,000 to about 45,000, available as Lexan 141 from the General Electric Company; a polycarbonate resin having a molecular weight of from about 50,000 to about 120,000, available as Makrolon from Farbenfabricken Bayer A. G., and a polycarbonate resin having a molecular weight of from about 20,000 to about 50,000 available from Bayer, USA. Methylene chloride solvent is a desirable component of the charge transport layer coating mixture for adequate dissolving of all the components and for its low boiling point.

Examples of photosensitive members having at least two electrically operative layers include the charge generator layer and diamine containing transport layer members disclosed in U.S. Pat. No. 4,265,990, U.S. Pat. No. 4,233,384, U.S. Pat. No. 4,306,008, U.S. Pat. No. 4,299,897 and U.S. Pat. No. 4,439,507. The disclosures of these patents are incorporated herein in their entirety. The photoreceptors may comprise, for example, a charge generator layer sandwiched between a conductive surface and a charge transport layer as described above or a charge transport layer sandwiched between a conductive surface and a charge generator layer.

If desired, a charge transport layer may comprise electrically active resin materials instead of or mixtures of inactive resin materials with activating compounds. Electrically active resin materials are well known in the art. Typical electrically active resin materials include, for example, polymeric arylamine compounds and related polymers described in U.S. Pat. No. 4,801,517, U.S. Pat. No. 4,806,444, U.S. Pat. No. 4,818,650, U.S. Pat. No. 4,806,443and U.S. Pat. No. 5,030,532. Polyvinylcarbazole and derivatives of Lewis acids described in U.S. Pat. No. 4,302,521. Electrically active polymers also include polysilylenes such as poly(methylphenyl silylene), poly(methylphenyl silylene-co-dimethyl silylene), poly(cyclohexylmethyl silylene), poly(tertiarybutylmethyl silylene), poly(phenylethyl silylene), poly(n-propylmethyl silylene), poly(p-tolylmethyl silylene), poly(cyclotrimethylene silylene), poly (cyclotetramethylene silylene), poly(cyclopentamethylene silylene), poly(di-t-butyl silylene-co-di-methyl silylene), poly(diphenyl silylene-co-phenylmethyl silylene), poly (cyanoethylmethyl silylene) and the like. Vinylaromatic polymers such as polyvinyl anthracene, polyacenaphthylene; formaldehyde condensation products with various aromatics such as condensates of formaldehyde and 3-bromopyrene; 2,4,7-trinitrofluorenone, and 3,6-dinitro-N-t-butylnaphthalimide as described in U.S. Pat. No. 3,972,717. Other polymeric transport materials include poly-1-vinylpyrene, poly-9-vinylanthracene, poly-9-(4-pentenyl)-carbazole, poly-9-(5-hexyl)-carbazole, polymethylene pyrene, poly-1-(pyrenyl)-butadiene, polymers such as alkyl, nitro, amino, halogen, and hydroxy substitute polymers such as poly-3-amino carbazole, 1,3-dibromo-poly-N-vinyl carbazole and 3,6-dibromo-poly-N-vinyl carbazole and numerous other transparent organic polymeric transport materials as Described in U.S. Pat. No. 3,870,516. The disclosures of each of the patents identified above pertaining to binders having charge transport capabilities are incorporated herein by reference in their entirety.

Other layers such as conventional electrically conductive ground strip along one edge of the belt in contact with the conductive layer, blocking layer, adhesive layer or charge generating layer may be used to facilitate connection of the electrically conductive layer of the photoreceptor to ground or to an electrical bias. Ground strips are well known and usually comprise conductive particles dispersed in a film forming binder.

Optionally, an overcoat layer may also be utilized to protect the charge transport layer and improve resistance to abrasion. These overcoat layers are well known in the art and may comprise thermoplastic organic polymers or inorganic polymers that are electrically insulating or slightly semi-conductive. Overcoatings are continuous and generally have a thickness of less than about 10 micrometers.

The anti-curl back coating of this invention is applied to the rear side of the substrate to provide flatness. The compositions for anti-curl back coating layers are well known in the art and may comprise thermoplastic organic polymers or inorganic polymers that are electrically insulating or slightly semi-conductive. Thus, any suitable film forming thermoplastic resin soluble in methylene chloride or other suitable solvent may be employed in the anticurl backing layer of this invention. Typical film forming resins include polycarbonate resin, polyvinylcarbazole, polyester, polyarylate, polyacrylate, polyether, polysulfone, polystyrene, and the like. Weight average molecular weights can vary from about 20,000 to about 150,000. However, molecular weights outside this range may used so long as the objectives of this invention are met.

Any suitable and conventional technique may be utilized to mix and thereafter apply the anticurl backing layer coating mixture to the supporting substrate layer. Typical application techniques include, for example extrusion coating, draw bar coating, roll coating, wire wound rod coating, and the like. The anticurl backing layer may be formed in a single coating step or in multiple coating steps. For example, an anticurl coating having a uniform thickness and covering substantially all of the exposed surface of the imaging member (including the regions where thicker edge regions will eventually be formed) may initially be applied with additional coating material being applied at the parallel sides of the substrate to form the thicker edge regions. If desired, the additional material used to thicken the anticurl backing layer in the minor edge regions may be a different compatible resin than the rest of the anticurl backing layer. Thus, this different resin can be applied in the minor edge regions as a thin layer on top of an anticurl backing layer having a uniform thickness. Alternatively, the different resin or the same resin may be applied as a thick anticurl backing layer for the minor edge region by a separate die in an edge to edge manner similar to the edge to edge extrusion of a ground strip and a charge transport layers disclosed in U.S. Pat. No. 4,521,457 described above. The entire disclosure of U.S. Pat. No. 4,521,457 is incorporated herein by reference. Thus, for example side by side dies may be employed with a central die extruding an anticurl backing layer having the usual uniform thickness and smaller dies located side by side with each end of the central die extruding thicker strips of anticurl backing layer material to form minor edge regions of a double wide imaging member. In still another embodiment, a slide die may be employed to form a second anticurl backing layer coating along the edge of (in the minor edge regions) and on top of a simultaneously formed or previously formed anticurl backing layer having a uniform thickness. Typical slide dies are described, for example, in U.S. Pat. No. 5,614,260, the entire disclosure thereof being incorporated herein by reference.

Drying of the deposited coating may be effected by any suitable conventional technique such as oven drying, infra red radiation drying, air drying and the like.

The thickness of anti-curl backing layers of this invention is varied in a specified way across the width of the imaging member sheet, web or belt to substantially balance the total curling forces of the layer or layers on the opposite side of the supporting substrate layer, even after extensive image cycling. Generally, the thickness of the major central region of an anti-curl backing layer of this invention has a substantially uniform thickness between about 10 to about 50 micrometers, but thicknesses outside this range can also be used. The major central region underlies the region where images are formed during an electrostatographic imaging process. The thicker minor edge regions of the anticurl backing layer are located along each parallel side of the imaging member and substantially underlie the regions where images are not formed during an electrostatographic imaging process. The minor edge regions of the anticurl backing layer each having a thickness greater than the thickness of the major central region. The additional thickness depends upon numerous factors, including the specific materials utilized in the imaging member above and below the supporting substrate, the thicknesses of the layers above and below the supporting substrate, the width of the imaging member, the width and shape of the minor edge region, and the like. A typical thickness range for the incremental increase of the thickest part of the minor edge region over the uniform thickness of the anticurl backing layer in the major central region is between about 0.1 micrometer and about 5 micrometers. The width of the minor edge region is typically between about 5 millimeters and about 100 millimeters. Preferably, for a single wide imaging member, the first minor edge region and the second minor edge region each have a width that is between about 1 percent and about 10 percent of the total width of the imaging member and the major central region has a width that is between about 80 percent and about 98 percent of the total width of the imaging member.

In a typical example, the added thickness of the thickest part of the minor edge region over the uniform thickness of the anticurl backing layer in the major central region is between about 1 micrometer and about 3 micrometers and the width of the minor edge region is about 25.4 millimeters (1 inch) for an anticurl backing layer having a uniform thickness of about 20 micrometers in the major central region reduces edge curl of a photoreceptor having a width of 50 centimeters.

The cross sectional shape of the part of a minor edge region above an imaginary extension of the exposed surface of the major central region, when viewed in a direction parallel to the parallel side of the imaging member, may have any suitable shape. Typical shapes include, for example, triangular, rectangular, square, oval, rhombic, and the like. The exposed sides of these shapes may be straight or curved. Preferably, for a minor edge region underlying only a charge transport layer, the shape is similar to a long thin right triangle with the second longest side of the triangle lying in contact with an imaginary extension of the exposed surface of the major central region of the anticurl backing layer and with the hypotenuse angling away from the nearest parallel side of the imaging member and inclined toward the exposed surface of the major central region of the anticurl backing layer. The shortest side of this right triangle example would represent the thickest part of the minor edge region over the uniform thickness of the anticurl backing layer in the major central region. Where the minor edge region underlies a ground strip layer in edge-to-edge contact with a charge transport layer, the preferred cross sectional shape of the minor edge region is similar to that of two back-to-back long thin right triangles with the apex of the two longest sides of one of the triangles located at the nearest parallel side of the imaging member and the apex of the two longest sides of the other of the triangles located at the border between the minor edge region and the major central region. Thus, the preferred cross sectional shape for a minor edge region is one which has (1) the greatest thickness at a parallel side or (2) the greatest thickness below a junction of a ground strip layer in edge-to-edge contact with a charge transport layer.

If desired, the anticurl back coating may comprise a minor amount of dispersed inorganic and/or organic particles dispersed in a film forming polymer. Typically, the dispersed blend of particles in a concentration of between about 0.1 weight percent and about 30 weight percent, based on the total weight of the dried anticurl coating layer, is satisfactory. However, a particle blend dispersion preferably contains from about 0.5 weight percent to about 20 weight percent. Optimum results are achieved for a particle blend dispersion containing between about 1 weight percent and about 10 weight percent. The use of dispersed particles is well known and described, for example, in U.S. Pat. No. 5,725,983 and U.S. Pat. No. 5,021,309, the entire disclosures thereof being incorporated herein by reference.

For electrographic imaging members, a flexible dielectric layer overlying the conductive layer may be substituted for the active photoconductive layers. Any suitable, conventional, flexible, electrically insulating, thermoplastic dielectric polymer matrix material may be used in the dielectric layer of the electrographic imaging member. If desired, the flexible belts of this invention may be used for other purposes where cycling durability is important.

The process of this invention for fabricating the flexible electrostatographic imaging webs described above and in the Examples below comprises providing a substrate layer having a first major side, a second major side, and at least a first parallel side and a second parallel side, forming an imaging layer on the first major side of the substrate layer, and forming an anticurl backing layer on the second major side of the substrate layer, the anticurl backing layer comprising a major central region having a substantially uniform thickness, a first minor edge region along the first parallel side, and a second minor edge region along the second parallel side, the first minor edge region and the second edge region each having a thickness greater than the thickness of the major central region. The anticurl layer may be formed by extrusion of anticurl coating material through a single die nozzle onto the second major side of the substrate layer. Alternatively, the anticurl layer may be formed by forming a first layer of anticurl material having a uniform thickness and forming the first minor edge region along the first parallel side and the second minor edge region along the second parallel side. If desired, the first layer of anticurl material, the first minor edge region and the second minor edge region may all be formed simultaneously.

PREFERRED EMBODIMENT OF THE INVENTION

A number of examples are set forth hereinbelow and are illustrative of different compositions and conditions that can be utilized in practicing the invention. All proportions are by weight unless otherwise indicated. It will be apparent, however, that the invention can be practiced with many types of compositions and can have many different uses in accordance with the disclosure above and as pointed out hereinafter.

EXAMPLE 1

Samples of an electrophotographic imaging member having a first parallel side and a second parallel side were prepared by providing a 0.02 micrometer thick titanium layer coated on a polyester substrate (Melinex 442, available from E. I. duPont de Nemours and Company) having a thickness of 3 mils (76.2 micrometers) and applying thereto, using a ½ mil gap Bird applicator, a solution containing 10 grams gamma aminopropyltriethoxy silane, 10.1 grams distilled water, 3 grams acetic acid, 684.8 grams of 200 proof denatured alcohol and 200 grams heptane. This layer was then allowed dry for 5 minutes at 135° C. in a forced air oven. The resulting blocking layer had an average dry thickness of 0.05 micrometer measured with an ellipsometer.

An adhesive interface layer was then prepared by applying with a ½ mil gap Bird applicator to the blocking layer a wet coating containing 0.5 percent by weight based on the total weight of the solution of polyester adhesive (Mor-Ester 49,000, available from Morton International, Inc.) in a 70.30 volume ratio mixture of tetrahydrofuran/cyclohexanone. The adhesive interface layer was allowed to dry for 5 minutes at 135° C. in the forced air oven. The resulting adhesive interface layer had a dry thickness of 0.065 micrometer.

The adhesive interface layer was thereafter coated with a photogenerating layer containing 7.5 percent by volume trigonal selenium, 25 percent by volume N,N'-diphenyl-N, N'-bis(3-methylphenyl)-1,1'-biphenyl-4,4'-diamine, and 67.5 percent by volume polyvinylcarbazole. This photogenerating layer was prepared by introducing 8 grams polyvinyl carbazole and 140 mls of a 1:1 volume ratio of a mixture of tetrahydrofuran and toluene into a 20 oz. amber bottle. To this solution was added 8 grams of trigonal selenium and 1,000 grams of ⅛ inch (3.2 millimeter) diameter stainless steel shot. This mixture was then placed on a ball mill for 72 to 96 hours. Subsequently, 50 grams of polyvinyl carbazole and 2.0 grams of N,N'-diphenyl-N,N'-bis(3-methyl phenyl)-1,1'-biphenyl-4,4'-diamine dissolved in 75 ml of 1:1 volume ratio of tetrahydrofuran/toluene. This slurry was then placed on a shaker for 10 minutes. The resulting slurry was thereafter applied to the adhesive interface layer by using a ½ mil gap Bird applicator to form a coating layer having a wet thickness of 0.5 mils (12.7 micrometers). However, a strip about 10 mm wide along one edge of the substrate bearing the blocking layer and the adhesive layer was deliberately left uncoated by any of the photogenerating layer material to facilitate adequate electrical contact by the ground strip layer that was applied later. This photogenerating layer was dried at 135° C. for 5 minutes in the forced air oven to form a dry photogenerating layer having a thickness of 2.0 micrometers.

This coated imaging member web was simultaneously overcoated with a charge transport layer and a ground strip layer using a 3 mil gap Bird applicator. The charge transport layer was prepared by introducing into an amber glass bottle a weight ratio of 1:1 N,N'-diphenyl-N,N'-bis(3-methylphenyl)-1,1'-biphenyl-4,4'-diamine and Makrolon 5705, a polycarbonate resin having a molecular weight of from about 50,000 to 100,000 commercially available from Farbensabricken Bayer A.G. The resulting mixture was dissolved to give a 15 percent by weight solid in 85 percent by weight methylene chloride. This solution was applied onto the photogenerator layer to form a coating which upon no drying had a thickness of 24 micrometers.

EXAMPLE II

An anticurl coating was prepared by combining 8.82 grams of polycarbonate resin (Makrolon 5705, available from Bayer AG), 0.72 gram of polyester resin (Vitel PE-200, available from Goodyear Tire and Rubber Company) and 90.1 grams of methylene chloride in a glass container to form a coating solution containing 8.9 percent solids. The container was covered tightly and placed on a roll mill for about 24 hours until the polycarbonate and polyester were dissolved in the methylene chloride to form the anticurl coating solution. The anticurl coating solution was then applied to the rear surface (side opposite the photogenerator layer and charge transport layer) of an imaging member sample of Example I with a 76 micrometer (3 mil) gap Bird draw bar applicator and dried at 135° C. for about 5 minutes in the forced air oven to produce a dried film thickness of about 13.5 micrometers. The resulting electrophotographic imaging member had an anticurl backing layer having a uniform thickness. This imaging member was used as a control.

EXAMPLE III

A draw bar with a uniform 76 micrometers (3 mil) gap was machined at each end of the gap at different time intervals, each machining increasing the depth of the gap at the gap ends in increments of 1 mil with the last machining extending the gap distance a total of 76 micrometers (3 mil). The machined portions of the gaps had the deepest point at the end of the original gap with the deepest end tapering up to the location of the original gap which still occupied most of the central region of the draw bar. The newly machined tapered gap shape was similar to the gap shown in FIG. 4 and quite unlike the draw bar of Example II which had a uniform 76 micrometer (3 mil) gap. Thus, the deepest parts of the gap ends for the different machining increments were 1, 2 and 3 mils greater than the depth of the original gap. The tapered part of the gap was about 25 millimeters long. The draw bar after each different machining stage was used to apply anticurl backing layer coating compositions identical to the one described in Example II to the back side of the substrate of samples of the imaging members described in Example I.

Measurements were taken on the hand coated samples after each modification of the draw bar. The measurements included edge thickness and curl from a flat surface. As the edge thickness in the minor edge regions of the anticurl layer increased, the belt curl was reduced. The average of 5 measurements are shown in TABLE A below:

TABLE A

| End Gap Depth | Left Edge Curl (mm) | Right Edge Curl (mm) |
| --- | --- | --- |
| 3 mil (control) | 5.8 | 5.1 |
| 4 mil | 4.7 | 4.3 |
| 5 mil | 5.6 | 5.0 |
| 6 mil | 3.1 | 2.3 |

A flat photoreceptor will essentially have 0 mm curl at the edges. Table A shows how an increase in the gap of the draw bar at the edges will produce a thicker coating of anticurl backing layer the edges which in turn lessens the amount of edge curl measured in the control example.

Edge thickness in the minor end regions of the anticurl layer were measured down and across the samples. An average of 5 readings were taken at the various milled thicknesses. Overall coating thicknesses in the minor end regions of the anticurl layer were increased as the draw bar gap was increased at the ends of the gap. The edge coating thickness results are shown in TABLE B below:

TABLE B

| WET Gap Depth (mils) | Edge 1 (mm) | Edge 2 (mm) |
|---|---|---|
| 3 (control) | 0.00452 | 0.00452 |
| 4 | 0.00456 | 0.00454 |
| 5 | 0.00468 | 0.00466 |
| 6 | 0.00474 | 0.00474 |

Table B shows the increase in anticurl backing layer thicknesses at the edges when they are coated using draw bars with increasing wet gaps. These thicknesses at the edge, correspond to the curl readings displayed in Table A. Small increases in anticurl backing layer thicknesses have a large influence in lessening the amount of measured curl of the control. The central region, in all cases, maintained the thickness of the control.

Although the invention has been described with reference to specific preferred embodiments, it is not intended to be limited thereto, rather those having ordinary skill in the art will reocognize that variations and modifications may be made therein which are within the spirit of the invention and within the scope of the claims.

What is claimed is:

1. A flexible electrostatographic imaging member having at least a first parallel side and a second parallel side, the imaging member comprising
   a supporting substrate layer,
   at least one imaging layer on one side of the substrate layer,
   and an anticurl backing layer on the opposite side of the substrate layer, the anticurl backing layer comprising
      a major central region having a substantially uniform thickness,
      a first minor edge region along the first parallel side, and
      a second minor edge region along the second parallel side, the first minor edge region and the second edge region each having a thickness greater than the thickness of the major central region.

2. A flexible electrostatographic imaging member according to claim 1 wherein the imaging member is a web.

3. A flexible electrostatographic imaging member according to claim 1 wherein the imaging member is a belt.

4. A flexible electrostatographic imaging member according to claim 1 wherein the major central region has a thickness between about 2 micrometers and about 50 micrometers.

5. A flexible electrostatographic imaging member according to claim 1 wherein the first minor edge region and second minor edge region have a maximum thickness between about 0.01 micrometer and about 5 micrometers thicker than the thickness of the major central region.

6. A flexible electrostatographic imaging member according to claim 1 wherein the first minor edge region and the second minor edge region each have a width that is between about 1 percent and about 10 percent of the total width of the imaging member.

7. A flexible electrostatographic imaging member according to claim 1 wherein the major central region has a width that is between about 80 percent and about 98 percent of the total width of the imaging member.

8. A flexible electrostatographic imaging member according to claim 1 wherein the imaging member is an electrophotographic imaging member.

9. A flexible electrostatographic imaging member according to claim 8 wherein the imaging layer comprises a charge generating layer and a charge transport layer.

10. A flexible electrostatographic imaging member according to claim 9 wherein the charge transport layer extends from the first parallel side to the second parallel side.

11. A flexible electrostatographic imaging member according to claim 9 wherein the imaging member has a narrow ground strip layer along the first parallel side of the imaging member adjacent to and in edge to edge contact with the charge transport layer, the edge contact extending parallel to the first parallel side.

12. A flexible electrostatographic imaging member according to claim 10 wherein the narrow ground strip layer has a width between about 1 millimeter and about 50 millimeters.

13. A flexible electrostatographic imaging member according to claim 11 wherein the first minor edge region is under the narrow ground strip and has a width extending from substantially the first parallel side past the edge contact and under a narrow region of the charge transport layer.

14. A flexible electrostatographic imaging member according to claim 13 wherein a cross section of the first minor edge region viewed in a direction parallel to the first parallel side has a peak located substantially under the edge contact.

15. A flexible electrostatographic imaging member according to claim 14 wherein the first minor edge region has a width that is between about 1 percent and about 10 percent of the total width of the imaging member and the second minor edge region has a width that is between about 1 percent and about 10 percent of the total width of the imaging member.

16. A flexible electrostatographic imaging member according to claim 14 wherein thickness of the cross section of the first minor edge region gradually becomes thinner in a direction away from the peak and toward the first parallel side and also becomes thinner in a direction away from the peak toward the second parallel side.

17. A flexible electrostatographic imaging member according to claim 14 wherein the thickness of the cross section of the second minor edge region gradually becomes thinner in a direction away from the second parallel side and toward the first parallel side.

18. A flexible electrostatographic imaging member according to claim 14 wherein the cross section of the second minor edge region has a thin wedge shape.

19. A flexible electrostatographic imaging member according to claim 1 wherein the imaging member is an electrographic imaging member.

20. A flexible electrostatographic imaging member according to claim 1 wherein the imaging member is an intermediate transfer belt.

21. A process for fabricating a flexible electrostatographic imaging member comprising
   providing a substrate layer having a first major side, a second major side, and at least a first parallel side and a second parallel side,
   forming an imaging layer on the first major side of the substrate layer, and
   forming an anticurl backing layer on the second major side of the substrate layer, the anticurl backing layer comprising
      a major central region having a substantially uniform thickness,
      a first minor edge region along the first parallel side, and
      a second minor edge region along the second parallel side, the first minor edge region and the second edge region each having a thickness greater than the thickness of the major central region.

22. A process according to claim 21 comprising forming the anticurl layer by extrusion of anticurl coating material through a single die nozzle onto the second major side of the substrate layer.

23. A process according to claim 21 comprising forming the anticurl layer by forming a first layer of anticurl material having a uniform thickness and forming the first minor edge region along the first parallel side and the second minor edge region along the second parallel side.

24. A process according to claim 23 comprising forming the anticurl layer by simultaneously forming the first layer of anticurl material, the first minor edge region and the second minor edge region.

* * * * *